United States Patent
Takatani et al.

(10) Patent No.: US 11,189,407 B2
(45) Date of Patent: Nov. 30, 2021

(54) GRAIN-ORIENTED ELECTRICAL STEEL SHEET

(71) Applicant: NIPPON STEEL CORPORATION, Tokyo (JP)

(72) Inventors: Shinsuke Takatani, Tokyo (JP); Yoshiyuki Ushigami, Tokyo (JP); Hiroyasu Fujii, Tokyo (JP); Shuichi Nakamura, Tokyo (JP); Takeshi Imai, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/628,809

(22) PCT Filed: Jul. 13, 2018

(86) PCT No.: PCT/JP2018/026624
§ 371 (c)(1),
(2) Date: Jan. 6, 2020

(87) PCT Pub. No.: WO2019/013355
PCT Pub. Date: Jan. 17, 2019

(65) Prior Publication Data
US 2020/0203047 A1 Jun. 25, 2020

(30) Foreign Application Priority Data
Jul. 13, 2017 (JP) .............................. JP2017-137408

(51) Int. Cl.
*H01F 1/147* (2006.01)
*G01N 21/57* (2006.01)
(Continued)

(52) U.S. Cl.
CPC ....... *H01F 1/14775* (2013.01); *C22C 38/001* (2013.01); *C22C 38/008* (2013.01);
(Continued)

(58) Field of Classification Search
CPC .. C21D 8/12; C21D 9/46; C22C 38/00; C22C 38/001; C22C 38/008; C22C 38/02;
(Continued)

(56) References Cited

U.S. PATENT DOCUMENTS

| | | | |
|---|---|---|---|
| 5,125,991 A | 6/1992 | Ishitobi et al. | |
| 2002/0139444 A1* | 10/2002 | Kosuge | C23C 8/18 148/111 |
| 2016/0194731 A1 | 7/2016 | Han et al. | |

FOREIGN PATENT DOCUMENTS

| EP | 0 565 029 A1 | 10/1993 |
|---|---|---|
| JP | 48-39338 A | 6/1973 |

(Continued)

OTHER PUBLICATIONS

"Geometrical Product Specifications (GPS)—Surface texture: Profile method—Terms, definitions and surface texture parapeters", JIS B 0601, 2013, (ISO 4287: 1997, Amd. 1: 2009), total 83 pages.
(Continued)

*Primary Examiner* — Jenny R Wu
(74) *Attorney, Agent, or Firm* — Birch, Stewart, Kolasch & Birch, LLP

(57) ABSTRACT

A grain-oriented electrical steel sheet includes: a steel sheet; and an amorphous oxide layer that is formed on the steel sheet, in which a glossiness of a surface is 150% or higher.

6 Claims, 1 Drawing Sheet

(51) Int. Cl.
  *C22C 38/34* (2006.01)
  *C22C 38/04* (2006.01)
  *C22C 38/00* (2006.01)
  *C22C 38/02* (2006.01)
  *C22C 38/06* (2006.01)
  *C22C 38/60* (2006.01)

(52) U.S. Cl.
  CPC .............. *C22C 38/02* (2013.01); *C22C 38/04* (2013.01); *C22C 38/06* (2013.01); *C22C 38/34* (2013.01); *C22C 38/60* (2013.01); *G01N 21/57* (2013.01)

(58) Field of Classification Search
  CPC ......... C22C 38/04; C22C 38/06; C22C 38/34; C22C 38/60; C23C 22/00; H01F 1/147; H01F 1/14775
  See application file for complete search history.

(56) References Cited

FOREIGN PATENT DOCUMENTS

| | | | |
|---|---|---|---|
| JP | 63024099 A | * | 2/1988 |
| JP | 6-184762 A | | 7/1994 |
| JP | 06184762 A | * | 7/1994 |
| JP | 7-278670 A | | 10/1995 |
| JP | 7-278833 A | | 10/1995 |
| JP | 11-106827 A | | 4/1999 |
| JP | 11-118750 A | | 4/1999 |
| JP | 2002-322566 A | | 11/2002 |
| JP | 2002-348643 A | | 12/2002 |
| JP | 2002-363763 A | | 12/2002 |
| JP | 2003-268450 A | | 9/2003 |
| JP | 2003-293149 A | | 10/2003 |
| JP | 2003-313644 A | | 11/2003 |
| JP | 2009-228117 A | | 10/2009 |
| JP | 2009228117 A | * | 10/2009 |
| JP | 2010-40666 A | | 2/2010 |
| JP | 2015168869 A | * | 9/2015 |
| JP | 2016-513358 A | | 5/2016 |
| WO | WO 2010/013109 A1 | | 2/2010 |
| WO | WO-2016085257 A1 * | 6/2016 | ............... C21D 1/68 |

OTHER PUBLICATIONS

"Specular glossiness—Methods of measurement", JIS Z 8741, 1997, total 41 pages.

International Search Report, issued in PCT/JP2018/026624, dated Sep. 25, 2018.

Written Opinion of the International Searching Authority, issued in PCT/JP2018/026624, dated Sep. 25, 2018.

\* cited by examiner

GRAIN-ORIENTED ELECTRICAL STEEL SHEET

TECHNICAL FIELD OF THE INVENTION

The present invention relates to a grain-oriented electrical steel sheet that is used as an iron core material of a transformer and particularly relates to a grain-oriented, electric steel sheet with an amorphous oxide layer having excellent adhesion with a tension-insulation coating.

Priority is claimed on Japanese Patent Application No. 2017-137408, filed on Jul. 13, 2017, the content of which is incorporated herein by reference.

RELATED ART

A grain-oriented electrical steel sheet is used mainly in a transformer. A transformer is continuously excited over a long period of time from installation disuse such that energy loss continuously occurs. Therefore, energy loss occurring when the transformer is magnetized by an alternating current, that is, iron loss is a main parameter that determines the performance of the transformer.

In order to reduce iron loss of a grain-oriented electrical steel sheet, many techniques have been developed from the viewpoint of (a) highly aligning grains in the {110}<001> orientation (Toss orientation), (b) increasing the content of a solid solution element, such as Si to increase the electric resistance of the steel sheet, or (c) reducing the thickness of the electrical steel sheet.

In addition, a method of applying tension to a steel sheet is effective for reducing iron loss. Formation of a coating, on a steel sheet surface at a high temperature using a material having a lower thermal expansion coefficient than the steel sheet is an effective method for reducing iron loss. In a final annealing process of an electrical steel sheet, a forsterite film having excellent coating adhesion that is formed by a reaction of an oxide on a steel sheet surface and an annealing separator can apply tension to the steel sheet.

For example, a method disclosed in Patent Document 1 in which an insulation coating is formed by baking a coating solution including colloidal silica and a phosphate as main components to a steel sheet surface has a high effect of applying tension to a steel sheet and thus is effective for reducing iron loss. Accordingly, a method of forming an insulating coating including a phosphate as a main component in a state where a forsterite film formed in a final annealing process remains is a general method of manufacturing a grain-oriented electrical steel sheet.

However, recently, it has been clarified that the forsterite film inhibits a domain wall motion and adversely affects iron loss. In a grain-oriented electrical steel sheet, a magnetic domain changes depending on a domain wall motion in an alternating magnetic field. In order to reduce iron loss, it is effective that the domain wall motion is smooth and rapid. However, the forsterite film has an uneven, structure in as steel sheet/film interface, and this uneven structure inhibits a domain wall motion. Therefore, it is presumed that the uneven structure adversely affects iron loss.

Accordingly, a technique of suppressing formation of a forsterite film and smoothing a steel sheet surface has been investigated. For example, Patent Documents 2 to 5 disclose a technique of controlling an atmosphere dew point of decarburization annealing and using alumina as an annealing separator so as to smooth a steel sheet surface without forming a forsterite film during final annealing.

However, when a steel sheet surface is smoothed as described above, in order to apply tension to the steel sheet, it is necessary to form a tension-insulation coating having sufficient adhesion.

In order to solve this problem, Patent Document 6 discloses a method of forming a tension-insulation coating after forming an amorphous oxide layer on a steel sheet surface. In addition, Patent Documents 7 to 11 disclose a technique of controlling a structure of an amorphous oxide layer in order to form a tension-insulation coating having higher adhesion.

Patent Document 7 discloses a method of securing coating adhesion between a tension-insulation coating and a steel sheet. In this method, coating adhesion is secured by performing a pre-treatment on a smoothed steel sheet surface of a grain-oriented electrical steel sheet to introduce fine unevenness on the steel sheet surface, forming an externally oxidized layer thereon, and forming an externally oxidized granular oxide including silica as a main component, which penetrates the thickness of the externally oxidized layer.

Patent Document 8 discloses a method of securing coating adhesion between a tension-insulation coating and a steel sheet. In this method, in a heat treatment process for forming an, externally oxidized layer on a smoothed steel sheet surface of a grain-oriented electrical steel sheet, a temperature rising rate in a temperature range of 200° C. to 1150° C. is controlled to be 10° C./sec to 500° C./sec such that a cross-sectional area fraction of a metal oxide of iron, aluminum, titanium, manganese, or chromium, or the like in the externally oxidized layer is 50% or less. As a result, coating adhesion between the tension-insulation coating and the steel sheet is secured.

Patent Document 9 discloses a method of securing coating adhesion between a tension-insulation coating and a steel sheet. In this method, in a step of forming a tension-insulation coating after forming an externally oxidized layer on a smoothed steel sheet surface of a grain-oriented electrical steel sheet, a contact time between the steel sheet on which the externally oxidized layer is formed and a coating solution for forming the tension-insulation coating is set to be 20 seconds or shorter such that a proportion of a low density layer in the externally oxidized layer is 30% or less. As a result, coating adhesion between the tension-insulation coating and the steel sheet is secured.

Patent Document 10 discloses a method of securing coating adhesion between a tension-insulation coating and a steel sheet. In this method, a heat treatment for forming an externally oxidized layer on a smoothed steel sheet surface of a grain-oriented electrical steel sheet is performed at a temperature of 1000° C. or higher, and a cooling rate in a temperature range of a temperature at which the externally oxidized layer is formed to 200° C. is controlled to be 100° C./sec or lower such that a cross-sectional area fraction of voids in the externally oxidized layer is 30% or lower. As a result, coating adhesion between the tension-insulation coating and the steel sheet is secured.

Patent Document 11 discloses a method of securing coating adhesion between a tension-insulation coating and a steel sheet. In this method, in a heat treatment process for forming an externally oxidized layer on a smoothed, steel sheet surface of a grain-oriented electrical steel sheet, a heat treatment is performed under conditions, in which heat treatment temperature is 600° C. to 1150° C. and atmosphere dew point is −20° C. to 0° C., annealing is performed at a cooling atmosphere dew point of 5° C. to 60° C. and a cross-sectional area fraction of metallic iron in the externally oxidized layer is 5% to 30%. As a result, coating adhesion between the tension-insulation coating and the steel sheet is secured.

However, sufficient adhesion between a tension-insulation coating and a steel sheet cannot be obtained with any of the methods disclosed in Patent Documents 7 to 11, and it may be difficult to sufficiently exhibit the expected effect of reducing iron loss.

PRIOR ART DOCUMENT

Patent Document

[Patent Document 1] Japanese Unexamined Patent Application, First Publication No. S48-039338
[Patent Document 2] Japanese Unexamined Patent Application, First Publication No. H7-278670
[Patent Document 3] Japanese Unexamined Patent Application, First Publication No. H11-106827
[Patent Document 4] Japanese Unexamined Patent Application, First Publication No. H11-118750
[Patent Document 5] Japanese Unexamined Patent Application, First Publication No. 2003-268450
[Patent Document 6] Japanese Unexamined Patent Application, First Publication No. H7-278833
[Patent Document 7] Japanese Unexamined Patent Application, First Publication No. 2002-322566
[Patent Document 8] Japanese Unexamined Patent Application, First Publication No. 2002-348643
[Patent Document 9] Japanese Unexamined Patent Application. First Publication No. 2003-293149
[Patent Document 10] Japanese Unexamined Patent Application, First Publication No. 2002-363763
[Patent Document 11] Japanese Unexamined Patent Application, First Publication No. 2003-313644

DISCLOSURE OF THE INVENTION

Problems to be Solved by the Invention

The present invention has been made in consideration of the current situation of the techniques of the related art in order to significantly reduce iron loss, and an object thereof is to improve adhesion between a tension-insulation coating and a steel sheet when the tension-insulation coating is formed on a surface of a grain-oriented electrical steel sheet not including a forsterite film. That is, an object of the present invention, is to provide, a grain-oriented electrical steel sheet having excellent adhesion with a tension-insulation coating.

Means for Solving the Problem

The present inventors conducted a thorough investigation on a method for achieving the object. As a result, it was found that adhesion between a tension-insulation coating and a steel sheet can be significantly improved by forming an amorphous oxide layer on a surface of a steel sheet not including a forsterite film, which is obtained by removing the forsterite film or intentionally preventing the formation of forsterite, such that a glossiness of the steel sheet on which the coating is formed is 150% or higher.

The present invention has been made based on the above findings, and the scope thereof is as follows.

(1) According to one aspect of the present invention, there is provided a grain-oriented electrical steel sheet including: a steel sheet; and an amorphous oxide layer that is formed on the steel sheet, in which a glossiness of a surface is 150% or higher.

(2) In the grain-oriented electrical steel sheet according to (1), the steel sheet may include, as a chemical composition, by mass %, C: 0.085% or less, Si: 0.80% to 7.00%, Mn: 1.00% or less, Al: 0.065% or less, S: 0.013% or less, Cu: 0% to 0.01% to 0.80%, N: 0% to 0.012%, P: 0% to 0.5%, Ni: 0% to 1.0%, Sn: 0% to 0.3%, Sb: 0% to 0.3%, and a remainder of Fe and impurities.

(3) In the grain-oriented electrical steel sheet according to (2), the steel sheet may include, as the chemical composition, by mass %, Cu: 0.01% to 0.80%.

(4) In the grain-oriented electrical steel sheet according to any one of (1) to (3), the glossiness may be measured using a method described in JIS Z-8741.

Effects of the Invention

According to the aspect of the present invention a grain-oriented electrical steel sheet having excellent adhesion between a tension-insulation coating and a steel sheet can be provided.

EMBODIMENTS OF THE INVENTION

Figure 1:
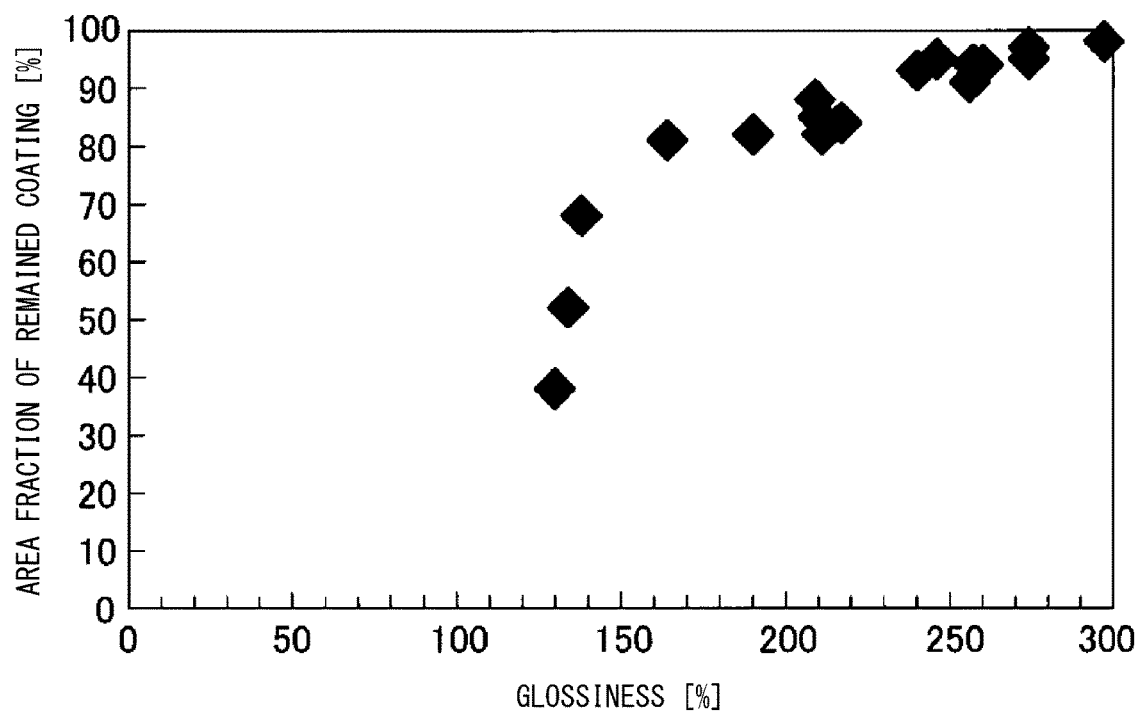
FIG. 1 is a diagram showing a relationship between a glossiness and an area fraction of remained coating.

A grain-oriented electrical steel sheet according to an embodiment of the present invention (hereinafter, referred to as "electrical steel sheet according to the embodiment") includes an amorphous oxide layer on a steel sheet surface and a glossiness of a surface is 150% or higher. In other words, the grain-oriented electrical steel sheet according to the embodiment includes: a steel sheet; and an amorphous oxide layer that is formed on the steel sheet, in which a glossiness of a surface is 150% or higher.

Hereinafter, the electrical steel sheet according to the embodiment will be described.

The present inventors conducted an investigation on a method of securing coating adhesion with a tension-insulation coating when the tension-insulation coating for reducing iron loss is formed on a steel sheet surface not including a forsterite film. As a result, the present inventors conceived an idea that it is important to uniformize (smooth) the morphology of the amorphous oxide layer such that stress concentration on an interface between the tension-insulation coating and the steel sheet is suppressed as much as possible, when forming an amorphous oxide layer on a surface of the steel sheet not including a forsterite film (in particular, forming the amorphous oxide layer to be in direct contact with the surface of the steel sheet). The steel sheet not including a forsterite film can be formed by removing the forsterite film after final annealing or by intentionally preventing the formation of forsterite. For example, by adjusting the composition of an annealing separator, the formation of forsterite can be intentionally prevented.

It is presumed that, as described above, by forming an amorphous oxide layer on a surface of the steel sheet (base steel sheet) not including a forsterite film and subsequently uniformizing (smoothing) the morphology of the amorphous oxide layer, adhesion between a tension-insulation coating formed on the amorphous oxide layer and the steel sheet can be improved. However, the thickness of the amorphous oxide layer is extremely small at about several nanometers, and thus it is extremely difficult to determine whether or not the morphology is uniform. Therefore, the present inventors investigated a method of evaluating the uniformity of the morphology of the amorphous oxide layer. As a result, it was found that the uniformity of the morphology of the amorphous oxide layer can be evaluated by using the glossiness of the steel sheet surface including the amorphous oxide layer. That is, it was found that, as the glossiness of the steel sheet surface increases, the morphology of the amorphous oxide layer formed on the steel sheet surface becomes more uniform.

Based on this idea, the present inventors conducted the following experiment to investigate a relationship between the adhesion (coating adhesion) with the tension-insulation coating and glossiness of the steel sheet surface of the grain-oriented electrical steel sheet including the amorphous oxide layer.

An annealing separator including alumina as a main component was applied to a decarburization annealed sheet as a material for the experiment having a thickness of 0.23 mm including 3.4% of Si, and final annealing was performed thereon for secondary recrystallization. As a result, a grain-oriented electrical steel sheet not including a forsterite film was prepared. A heat treatment was performed on the grain-oriented electrical steel sheet in an atmosphere including 25% of nitrogen and 75% of hydrogen and having a dew point of −30° C. to 5° C. for a soaking time of 10 seconds to form an amorphous oxide layer including silica ($SiO_2$) as a main component, on a steel sheet surface.

The glossiness of the surface of the grain-oriented electrical steel sheet including the amorphous oxide layer was measured using a method described in JIS Z-8741 (method of measuring the glossiness relative to 100 which is a value obtained by measuring a black glass reference plate (refractive index: 1.567) at an incidence angle of 60°).

Next, a coating solution including a phosphate, chromic acid, and colloidal silica as main components was applied to the surface of the grain-oriented electrical steel sheet including the amorphous oxide layer and was baked in a nitrogen atmosphere at 835° C. for 30 seconds to form a tension-insulation coating.

In the grain-oriented electrical steel sheet with the tension-insulation coating prepared as described above, the coating adhesion of the tension-insulation coating was investigated.

The coating adhesion of the tension-insulation coating was evaluated by winding a test piece from the above-described steel sheet around a cylinder having a diameter of 20 mm (180° bending), and obtaining an area fraction of a portion of the tension-insulation coating (hereinafter, referred to as "area fraction of remained coating") remaining adhering to the steel sheet without being peeled off from the steel sheet in a state where the test piece was bent back. The area fraction of remained coating may be measured by visual inspection.

FIG. 1 is a diagram showing a relationship between a glossiness and an area fraction of remained coating. When conditions where the coating adhesion of the tension-insulation coating can be secured are obtained from FIG. 1 the conditions are as follows.

(i) When the glossiness is 150% or higher, the area fraction of remained coating is 80% or higher, and the coating adhesion of the tension-insulation coating is high.

(ii) When the glossiness is 230% or higher, the area fraction of remained coating is 90% or higher, and the coating adhesion of the tension-insulation coating is higher.

Based on the above-described results, the electrical steel sheet according to the embodiment is regulated such that the electrical steel sheet includes: a steel sheet; and an amorphous oxide layer that is formed on a surface of the steel sheet, in which a glossiness of the surface of the grain-oriented electrical steel sheet including the amorphous oxide layer is 150% or higher. The glossiness is preferably 230% or higher.

Here, "amorphous" refers to a solid in which atoms or molecules are disordered without forming an ordered space lattice. Specifically, "amorphous" refers to a state where only a halo is detected and a specific peak is not detected in X-ray diffraction.

In the electrical steel sheet according to the embodiment, the amorphous oxide layer is a coating consisting of a substantially amorphous oxide. Whether or not the coating includes an oxide can be verified by TEM or FT-IR.

The glossiness can be measured using the following method.

Using a commercially available glossmeter, for example, Micro-Tri-Gloss meter (4446) (manufactured by BYK-Gardner USA), the glossiness is measured using a method described in JIS Z-8741 (method of measuring the glossiness relative to 100 which is a value obtained by measuring a black glass reference plate (refractive index: 1.567) at an incidence angle of 60°).

When the tension-insulation coating is formed on the amorphous oxide layer, the glossiness may be measured after selectively removing the tension-insulation coating of a product steel sheet on which the tension-insulation coating is formed by wet etching of dipping the steel sheet in an etchant of 20% sodium hydroxide at 80° C. for 20 minutes.

From the viewpoint of securing the uniformity of the morphology of the amorphous oxide layer, it is preferable that the amorphous oxide layer is an externally oxidized amorphous oxide layer.

When the internally oxidized amorphous oxide layer is formed on the steel sheet surface instead of the externally oxidized amorphous oxide layer, the amorphous oxide layer becomes an origin of peeling and the tension-insulation coating may peel off from the steel sheet. Here, the internally oxidized amorphous oxide layer refers to an amorphous oxide layer in a state where a part of the amorphous oxide is inserted into the steel sheet in an interface between the steel sheet and the amorphous oxide, and an amorphous oxide in which an aspect ratio representing a ratio between the length of the inserted portion in a depth direction and the length of a base of the inserted portion is 1.2 or higher is defined as an internally oxidized amorphous oxide.

The component composition of the steel sheet (base steel sheet) does not directly affect the glossiness of the steel sheet surface. Therefore, the component composition (chemical composition) of the steel sheet for forming the amorphous oxide layer in the electrical steel sheet according to the embodiment is, not particularly limited. However, in order to obtain preferable characteristics of the grain-oriented electrical steel sheet after forming the amorphous oxide layer and/or the tension-insulation coating on the surface, the component composition is preferably in the following range. Hereinafter, % relating to the component composition represents mass %.

C: 0.085% or less

C is an element that significantly deteriorates iron loss characteristics by magnetic aging. When the C content is more than 0.085%, C remains even after decarburization annealing and iron loss characteristics deteriorate. Therefore, the C content is 0.085% or less. It is preferable that the C content is as less as possible from the viewpoint of improving iron loss characteristics. However, since the detection limit is about 0.0001%, 0.0001% is the substantial lower limit of the C content. From the viewpoint of improving iron loss characteristics, the C content is preferably 0.010% or less and more preferably 0.005% or less.

Si: 0.80% to 7.00%

Si is an element that contributes to improvement of magnetic characteristics. When the Si content is less than 0.80%, phase transformation of tea occurs during secondary recrystallization annealing, secondary recrystallization cannot be controlled, and high magnetic flux density and iron loss characteristics cannot be obtained. Therefore, the Si content is set to be 0.80% or more. The Si content is preferably 2.50% or more and more preferably 3.00% or more.

On the other hand, when the Si content is more than 7.00%, the steel sheet becomes brittle, and passability significantly deteriorates in a manufacturing process. Therefore, the Si content is set to be 7.00% or less. The Si content is preferably 4.00% or less and more preferably 3.75% or less.

Mn: 1.00% or less

When the Mn content, is more than 1.00%, phase transformation of steel occurs during secondary recrystallization annealing, and high magnetic flux density and iron loss characteristics cannot be obtained. Therefore, the Mn content is set to be 1.00% or lower. The Mn content is preferably 0.70% or less and more preferably 0.50% or less. The Al content may be 0%.

On the other hand, Mn is an austenite-forming element. When the Mn content is less than 0.01%, the effect cannot be sufficiently obtained, and the steel sheet becomes brittle during hot rolling. Therefore, the Mn content may be 0.01% or more. The Mn content is preferably 0.05% or more and more preferably 0.10% or more.

Al: 0.065% or less

When the Al content is more than 0.065%, the steel sheet also becomes brittle, and precipitation of AlN becomes non-uniform. As a result, a desired secondary recrystallization structure cannot be obtained, and, the magnetic flux density decreases. Therefore, the Al content is 0.065% or less. The Al content is preferably 0.060% or less and more preferably 0.055% or less. The Al content may be 0%.

On the other hand, Al is an element that forms AlN functioning as an inhibitor and contributes to improvement of magnetic characteristics. Therefore, when the Al content is less than 0.010% in the slab used for manufacturing, the amount of AlN formed is small, and secondary recrystallization does not progress sufficiently. Therefore, the Al content in the slab used for manufacturing is preferably 0.010% or more, and Al may remain in the steel sheet.

S: 0.013% or less

S is an element that forms a fine sulfide and deteriorates iron loss characteristics. It is preferable that the S content is as less as possible. However, since the detection limit is about 0.0001%, the S content may be 0.0001% or more. The S content is preferably 0.003% or more and more preferably 0.005% or more.

On the other hand, when the S content is more than 0.013%, iron loss characteristics significantly deteriorate. Therefore, the S content is 0.013% or less. The S content is preferably 0.010% or less and more preferably 0.005% or less.

Basically, the remainder in the electrical steel sheet according to the embodiment other than the above-described elements consists of Fe and impurities. However, in order to improve magnetic characteristics, the electrical steel sheet may include Cu in the following range in addition to the above-described elements. Since the electrical steel sheet does not necessarily include Cu, the lower limit of the Cu content is 0%.

Cu: 0% to 0.80%

Cu is an element that binds to S to form a precipitate functioning as an inhibitor. When the Cu content is less than 0.01%, the effect of the addition cannot be sufficiently obtained. In order to obtain this effect, it is preferable that the Cu content is 0.01% or more. The Cu content is preferably 0.04% or more and more preferably 0.08% or more.

On the other hand, when the Cu content is more than 0.80%, dispersion of precipitates becomes non-uniform, and the effect of reducing iron loss is saturated. Therefore, even when the steel sheet includes Cu, the Cu content is preferably 0.80% or less. The Cu content is preferably 0.60% or less and more preferably 0.50% or less.

In addition, the component composition may include at least one selected from the group consisting of N, P, Ni, Sn, and Sb within a range where the characteristics of the electrical steel sheet according to the embodiment do not deteriorate. Since the electrical steel sheet does not necessarily include these elements, the lower limit of the content of each of the elements is 0%.

N: 0% to 0.012%

N is an element that forms AlN functioning as an inhibitor. When the N content is less than 0.004%, formation of AlN is not sufficient. Therefore, in order to obtain the effect, the N content is preferably 0.004% or more. The N content is preferably 0.006% or more and more preferably 0.007% or more.

On the other hand, N is also an element that forms blisters (voids) in the steel sheet during cold rolling. When the N content is more than 0.012%, it is concerned that blisters (voids) are formed in the steel sheet during cold rolling. Therefore, even when the steel sheet includes N, the N content is preferably 0.012% or less. The N content is preferably 0.010% or less and more preferably 0.009% or less.

P: 0% to 0.50%

P is an, element that increases the specific resistance of the steel sheet to contribute to a decrease in iron loss. In order to reliably obtain the effect of the addition, it is preferable that the P content is 0.02% or more.

On the other hand, when the P content is more than 0.50%, rollability deteriorates. Therefore, even when the steel sheet includes P, the P content is preferably 0.50% or less. The P content is preferably 0.35% or less.

Ni: 0% to 1.00%

Ni is an element that increases the specific resistance of the steel sheet to contribute to a decrease in iron loss and controls the metallographic structure of the hot-rolled steel sheet to contribute to improvement of magnetic characteristics. In order to reliably obtain the effect of the addition, it is preferable that the Ni content is 0.02% or more.

On the other hand, when the Ni content is more than 1.00%, secondary recrystallization progresses unstably. Therefore, even when the steel sheet includes Ni, the Ni content is preferably 1.00% or less. The Ni content is preferably 0.25% or less.

Sn: 0% to 0.30%

Sb: 0% to 0.30%

Sn and Sb are elements that segregate in a grain boundary and have function to prevent Al from being oxidized by water emitted from the annealing separator during final annealing (due to this oxidation, the inhibitor intensity varies depending on coil positions, and magnetic characteristics vary). In order to reliably obtain the effect of the addition, it is preferable that the content of any of the elements is 0.02% or more.

On the other hand, when the amount of any of the elements is more than 0.30%, secondary recrystallization becomes unstable, and magnetic characteristics deteriorate. Therefore, the content of any of Sn and Sb is 0.30% or less. The amount of any of the elements is preferably 0.25% or less.

That is, the electrical steel sheet according to the embodiment includes the above-described elements and a remainder of Fe and impurities.

The steel sheet having the above-described component composition can be manufactured using a slab including C: 0.085% or less, Si: 0.80% to 7.00% Mn: 0.01% to 1.00%, Al: 0.010% to 0.065%, S: 0.001% to 0.013%, Cu: 0% to 0.01% to 0.80%, N: 0% to 0.012%, P: 0% to 0.50 Ni: 0% to 1.00%, Sn: 0% to 0.30%, Sb: 0% to 0.30%, and a remainder of Fe and impurities.

Next, a preferable method of manufacturing the electrical steel sheet according to the embodiment will be described.

Molten steel adjusted to have a required component composition is cast using a typical method (for example, continuous casting) to manufacture a slab for manufacturing a grain-oriented electrical steel sheet. Next, this slab is provided for typical hot rolling to obtain a hot-rolled steel sheet, and this hot-rolled steel sheet is coiled to obtain a hot-rolled coil. Next, the hot-rolled coil is uncoiled, hot-band annealing is performed thereon, cold rolling is performed once or cold rolling is performed multiple times while performing intermediate annealing therebetween. As a result, a steel sheet having the same thickness as that of a final product is obtained. Next, decarburization annealing is performed on the cold-rolled steel sheet.

It is preferable that decarburization annealing is performed in a wet hydrogen atmosphere. By performing decarburization annealing in the above-described atmosphere, the C content in the steel sheet is reduced in a region where deterioration of magnetic characteristics caused by magnetic aging do not occur in the steel sheet as a product, and primary recrystallization can be performed. This primary recrystallization is a preparation for secondary recrystallization.

After decarburization annealing, the steel sheet is annealed in an ammonia atmosphere to form AlN as an inhibitor in the steel sheet.

Next, final annealing is performed on the steel sheet at a temperature of 1100° C. or higher. Final annealing may be performed on the steel sheet coiled in the form of a coil. In this case, final annealing is performed after applying an annealing separator including $Al_2O_3$ as a main component to the steel sheet surface in order to prevent seizure of the steel sheet.

After completion of final annealing, the redundant annealing separator is removed using a scrubber and controls the surface state of the steel sheet. When the redundant, annealing separator is removed, it is preferable that cleaning with water is performed in addition to performing a treatment using a scrubber.

In the scrubber, the thread diameter of a brush is preferably 0.2 mm and 0.6 mm. It is not preferable that the thread diameter of the brush is more than 0.6 mm because the steel sheet surface is roughened (the roughness increases) and the glossiness after formation of the amorphous oxide layer decreases. On the other hand, it is not preferable that the thread diameter of the brush is less than 0.2 mm because the removal of a redundant annealing separator is not sufficient and the glossiness after formation of the amorphous oxide layer decreases.

After the removal of the annealing separator using the scrubber, the surface roughness (arithmetical mean Ra of JIS B0601) of the steel sheet is preferably about 0.2 to 0.6 μm.

Next, the steel sheet is annealed in a mixed atmosphere of hydrogen and nitrogen in which the oxygen partial pressure ($P_{H2O}/P_{H2}$) is adjusted to form an amorphous oxide layer on the steel sheet surface.

As described above, the glossiness of the surface (caused by the uniformity of the morphology of the amorphous oxide layer) affects the area fraction of remained coating (index indicating whether or not the coating adhesion with the tension-insulation coating is good or bad). The present inventors investigated a relationship between the oxygen partial pressure ($P_{H2O}/P_{H2}$) of the annealing atmosphere and the glossiness while changing the oxygen partial pressure ($P_{H2O}/P_{H2}$) in the annealing atmosphere for forming the amorphous oxide layer on the steel sheet after final annealing.

Figure 2:
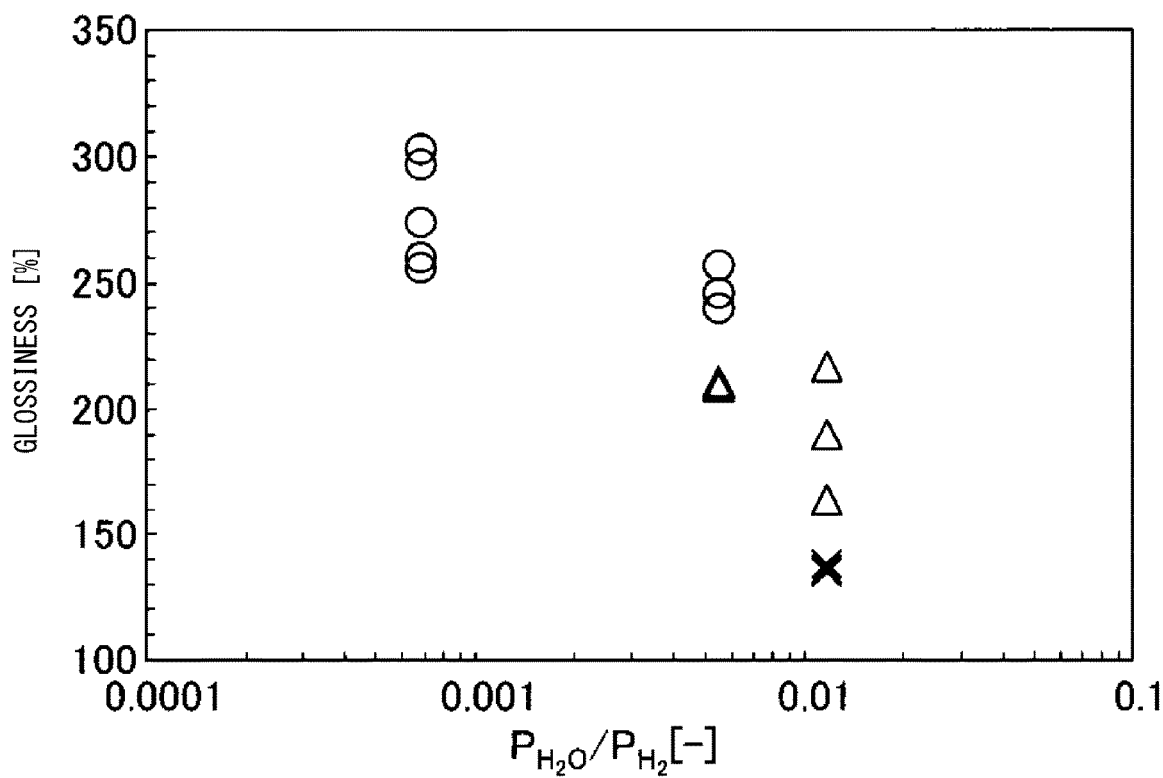
FIG. 2 is a diagram showing a relationship between an oxygen partial pressure of an annealing atmosphere for forming an amorphous oxide layer and a glossiness.

FIG. 2 is a diagram showing a relationship between the oxygen partial pressure of the annealing atmosphere for forming the obtained amorphous oxide layer and the glossiness. In FIG. 2, in the evaluation of coating adhesion, a case where the area fraction of remained coating is 90% or higher is indicated by "O" in the drawing, a case where the area fraction of remained coating is 80% or higher and lower than 90% is indicated by "Δ" in the drawing, and a case where the area fraction of remained coating is lower than 80% is indicated by "×" in the drawing.

It can be seen from FIG. 2 that the oxygen partial pressure ($P_{H2O}/P_{H2}$) of the annealing atmosphere for forming the amorphous oxide layer having a glossiness of 150% or higher is 0.010 or lower, that the oxygen partial pressure ($P_{H2O}/P_{H2}$) of the annealing atmosphere for forming the amorphous oxide layer having a glossiness of 230% or higher is 0.005 or lower, and that the oxygen partial pressure ($P_{H2O}/P_{H2}$) of the annealing atmosphere for forming the amorphous oxide layer having a surface glossiness of 250% or higher is 0.001 or lower.

Therefore, when the electrical steel sheet according to the embodiment is obtained, the oxygen partial pressure ($P_{H2O}/P_{H2}$) of the annealing atmosphere for forming, the amorphous oxide layer is preferably 0.010 or lower, more preferably 0.005 or lower, and still more preferably 0.001 or lower.

During annealing for forming the amorphous oxide layer, the annealing temperature is preferably 600° C. to 1150° C. and more preferably 700° C. to 900° C.

When the annealing temperature is lower than 600° C., the amorphous oxide layer is not sufficiently formed. In addition, when the annealing temperature is higher than 1150° C., the facility load becomes high, which is not preferable.

During annealing for forming the amorphous oxide layer, the cooling rate after annealing is not particularly limited. In order to perform a control such that the morphology of the externally oxidized amorphous oxide layer having an aspect ratio of lower than 1.2 is uniform, the oxygen partial pressure ($P_{H2O}/P_{H2}$) during annealing cooling is preferably 0.005 or lower.

As a result, the grain-oriented electrical steel sheet with the amorphous oxide layer having excellent the coating adhesion with the tension-insulation coating can be obtained.

EXAMPLES

Next, examples of the present invention will be described. However, conditions are merely exemplary examples to confirm the operability and the effects of the present invention, and the present invention is not limited to these condition examples. The present invention can adopt various conditions within a range not departing from the scope of the present invention as long as the object of the present invention can be achieved under the conditions.

EXAMPLES

Each of silicon steel slabs having component compositions (Steels No. A to F) shown in Table 1-1 was heated to 1100° C. and was hot-rolled to form a hot-rolled steel sheet having a thickness of 2.6 mm. After annealing the hot-rolled steel sheet at 1100° C., cold rolling was performed once or cold rolling was performed multiple times while performing intermediate annealing therebetween. As a result, a cold-rolled steel sheet having a final thickness of 0.23 mm was formed. Next, decarburization annealing and nitriding annealing were performed on the cold-rolled steel sheet.

the steel sheet was about 0.3 to 0.4 μm. In addition, components of the steel sheet after final annealing were analyzed. The results are as shown in Table 1-2.

Soaking (annealing) was performed on the grain-oriented electrical, steel sheet in an atmosphere including 25% of nitrogen and 75% of hydrogen and having an oxygen partial pressure shown in manufacturing conditions No. 1 to 17 shown in Table 2 at a holding temperature shown in Table 2. Next, a heat treatment of cooling the steel sheet to room temperature in an atmosphere including 25% of nitrogen and 75% of hydrogen and having an oxygen partial pressure shown in Table 2 was performed. When the holding temperature of annealing was 600° C. or higher, a coating was formed on the steel sheet surface.

Whether or not the coating formed on the steel sheet surface was an amorphous oxide layer was verified by X-ray diffraction and TEM. In addition, FT-IR was also used for the verification.

Specifically, with a combination of each of Steels No. on which the coating was formed and manufacturing conditions No., a cross-section of the steel sheet was processed by focused ion beam (FIB), and a 10 μm×10 μm range was observed with a transmission electron microscope (TEM), and it was verified that the coating was formed of $SiO_2$.

In addition, when the surface was analyzed by Fourier transform infrared spectroscopy (FT-IR), a peak was present at a wavenumber position of 1250 ($cm^{-1}$). Since this peak

TABLE 1-1

| Steel | Chemical Composition (mass %) | | | | | | | | | | |
|---|---|---|---|---|---|---|---|---|---|---|---|
| No. | C | Si | Mn | Al | S | Cu | N | P | Ni | Sb | Sn |
| A | 0.008 | 0.80 | 0.01 | 0.015 | 0.005 | 0.01 | 0 | 0 | 0 | 0 | 0 |
| B | 0.010 | 3.75 | 1.01 | 0.020 | 0.013 | 0.02 | 0.008 | 0 | 0 | 0 | 0 |
| C | 0.003 | 2.50 | 0.50 | 0.030 | 0.003 | 0.24 | 0.010 | 0.20 | 0 | 0 | 0 |
| D | 0.004 | 3.79 | 1.50 | 0.028 | 0.004 | 0.04 | 0.012 | 0.30 | 0.80 | 0 | 0 |
| E | 0.085 | 6.50 | 0.20 | 0.050 | 0.0008 | 0.03 | 0.012 | 0.40 | 0.90 | 0.20 | 0 |
| F | 0.008 | 7.00 | 0.80 | 0.065 | 0.0007 | 0.07 | 0.012 | 0.50 | 1.00 | 0.30 | 0.30 |

TABLE 1-2

| Steel | Chemical Composition (mass %) | | | | | | | | | | |
|---|---|---|---|---|---|---|---|---|---|---|---|
| No. | C | Si | Mn | Al | S | Cu | N | P | Ni | Sb | Sn |
| A | 0.006 | 0.80 | 0.00 | 0.008 | 0.003 | 0 | 0 | 0 | 0 | 0 | 0 |
| B | 0.008 | 3.70 | 0.08 | 0.012 | 0.005 | 0 | 0.000 | 0 | 0 | 0 | 0 |
| C | 0.001 | 2.23 | 0.32 | 0.021 | 0.001 | 0.21 | 0.009 | 0.20 | 0 | 0 | 0 |
| D | 0.002 | 3.60 | 1.20 | 0.018 | 0.002 | 0.03 | 0.010 | 0.30 | 0.80 | 0 | 0 |
| E | 0.060 | 6.20 | 0.08 | 0.032 | 0.0004 | 0.02 | 0.008 | 0.40 | 0.90 | 0.20 | 0 |
| F | 0.006 | 6.45 | 0.45 | 0.042 | 0.0003 | 0.06 | 0.007 | 0.50 | 1.00 | 0.30 | 0.30 |

Next, a water slurry of an annealing separator including alumina as a main component was applied to the cold-rolled steel sheet in which decarburization annealing and nitriding annealing were performed, and final annealing was performed at 1200° C. for 20 hours to complete secondary recrystallization. As a result, a grain-oriented electrical steel sheet having specular glossiness not including a forsterite film on the steel sheet surface was obtained. Before final annealing, the removal of the annealing separator and the control of the surface state were performed using a scrubber under conditions shown in Table 2. At this time, when the thread diameter of the scrubber was 0.2 to 0.6 μm, the surface roughness, (arithmetical mean Ra of JIS B0601) of was derived from $SiO_2$, it was also able to verify that the coating was formed of $SiO_2$ from this peak.

In addition, when X-ray diffraction was performed on the steel sheet including the coating, only halo was detected except for a peak of base metal, and a specific peak was not detected.

That is, all the formed films were the amorphous oxide layers.

Next, in order to evaluate adhesion with the tension-insulation coating, a coating solution for forming a tension-insulation coating including aluminum phosphate, chromic acid, and colloidal silica was applied to the grain-oriented electrical steel sheet on which, the amorphous oxide layer was formed, and was baked at 850° C. for 30 seconds. As a result, the grain-oriented electrical steel sheet with the tension-insulation coating was prepared.

A test piece collected from the prepared grain-oriented electrical steel sheet with the tension-insulation coating was wound around a cylinder having a diameter of 20 mm (180° bending), and was bent back. Next, an area fraction of remained coating was obtained, and coating adhesion with the insulation coating was evaluated based on the area fraction of remained coating. In the evaluation of the coating adhesion with the insulation coating whether or not the tension-insulation coating was peeled off was determined by visual, inspection. A case where the tension-insulation coating was not peeled off from the steel sheet and the area fraction of remained coating was 90% or higher was evaluated as "GOOD", and a case where the area fraction of remained coating was 80% or higher and lower than 90% was evaluated as "OK", and a case where the area fraction of remained coating was lower than 80% was evaluated as "NG".

In order to measure the glossiness of the surface of the grain-oriented electrical steel sheet with the amorphous oxide layer in which the tension-insulation coating was formed, the tension-insulation coating of the steel sheet as a product on which the tension-insulation coating was formed was selectively removed by wet etching of dipping the steel sheet in, an etchant of 20% sodium hydroxide at 80° C. for 20 minutes.

Using Micro-Tri-Gloss meter (4446) (manufactured by BYK-Gardner USA), the glossiness of the surface of the grain-oriented electrical steel sheet from which the tension-insulation coating was selectively removed was measured using a method described in JIS Z-8741 (method of measuring the glossiness relative to 100 which is a value obtained by measuring a black glass reference plate (refractive index: 1.567) at an incidence angle of 60°).

Table 2 shows the glossiness and the results of the evaluation of the coating adhesion with tension-insulation coating.

TABLE 2

| Manufacturing Condition No. | Manufacturing Conditions | | | | Evaluation of Characteristics | | | | | |
|---|---|---|---|---|---|---|---|---|---|---|
| | Scrubber Thread Diameter (μm) | Annealing | | | Steel No. A | | Steel No. B | | Steel No. C | |
| | | Atmosphere Oxygen Partial Pressure | Holding Temperature (° C.) | Oxygen Partial Pressure during Cooling | Glossiness (%) | Coating Adhesion | Glossiness (%) | Coating Adhesion | Glossiness (%) | Coating Adhesion |
| 1 | 0.1 | 0.005 | 600 | 0.005 | 120 | NG | 110 | NG | 115 | NG |
| 2 | 1.0 | 0.001 | 850 | 0.001 | 100 | NG | 105 | NG | 103 | NG |
| 3 | 0.1 | 0.007 | 1150 | 0.007 | 60 | NG | 61 | NG | 60 | NG |
| 4 | 0.1 | 0.008 | 800 | 0.008 | 62 | NG | 68 | NG | 64 | NG |
| 5 | 0.8 | 0.004 | 500 | 0.004 | 110 | NG | 108 | NG | 112 | NG |
| 6 | 0.8 | 0.0008 | 550 | 0.0008 | 104 | NG | 100 | NG | 111 | NG |
| 7 | 0.2 | 0.001 | 500 | 0.001 | 148 | NG | 144 | NG | 145 | NG |
| 8 | 0.4 | 0.010 | 450 | 0.010 | 142 | NG | 142 | NG | 139 | NG |
| 9 | 0.5 | 0.020 | 850 | 0.020 | 138 | NG | 130 | NG | 130 | NG |
| 10 | 0.6 | 0.040 | 650 | 0.040 | 145 | NG | 143 | NG | 141 | NG |
| 11 | 0.2 | 0.004 | 600 | 0.004 | 150 | OK | 154 | OK | 151 | OK |
| 12 | 0.4 | 0.002 | 640 | 0.002 | 180 | OK | 179 | OK | 169 | OK |
| 13 | 0.6 | 0.003 | 690 | 0.003 | 175 | OK | 183 | OK | 198 | OK |
| 14 | 0.2 | 0.0009 | 835 | 0.0009 | 210 | OK | 220 | OK | 220 | OK |
| 15 | 0.4 | 0.0005 | 850 | 0.0005 | 230 | GOOD | 240 | GOOD | 239 | GOOD |
| 16 | 0.5 | 0.0003 | 870 | 0.0003 | 280 | GOOD | 265 | GOOD | 278 | GOOD |
| 17 | 0.6 | 0.0004 | 880 | 0.0004 | 320 | GOOD | 299 | GOOD | 302 | GOOD |

| Evaluation of Characteristics | | | | | | |
|---|---|---|---|---|---|---|
| Steel No. D | | Steel No. E | | Steel No. F | | |
| Glossiness (%) | Coating Adhesion | Glossiness (%) | Coating Adhesion | Glossiness (%) | Coating Adhesion | Note |
| 118 | NG | 114 | NG | 116 | NG | Comparative Example |
| 102 | NG | 108 | NG | 105 | NG | Comparative Example |
| 62 | NG | 63 | NG | 61 | NG | Comparative Example |
| 67 | NG | 69 | NG | 70 | NG | Comparative Example |
| 109 | NG | 107 | NG | 112 | NG | Comparative Example |
| 103 | NG | 105 | NG | 111 | NG | Comparative Example |
| 148 | NG | 147 | NG | 148 | NG | Comparative Example |
| 141 | NG | 142 | NG | 143 | NG | Comparative Example |
| 135 | NG | 136 | NG | 139 | NG | Comparative Example |
| 141 | NG | 143 | NG | 146 | NG | Comparative Example |
| 153 | OK | 150 | OK | 151 | OK | Example |
| 164 | OK | 168 | OK | 168 | OK | Example |
| 188 | OK | 189 | OK | 198 | OK | Example |
| 228 | OK | 214 | OK | 217 | OK | Example |
| 240 | GOOD | 236 | GOOD | 239 | GOOD | Example |
| 260 | GOOD | 279 | GOOD | 288 | GOOD | Example |
| 298 | GOOD | 312 | GOOD | 305 | GOOD | Example |

It can be seen from Table 2 that, when the glossiness of the surface of the grain-oriented electrical steel sheet with the amorphous oxide layer is 150% or higher, excellent, coating adhesion can be obtained.

INDUSTRIAL APPLICABILITY

As described above, according to the present invention, the grain-oriented electrical steel sheet with the amorphous oxide layer having excellent adhesion between the tension-insulation coating formed on the steel sheet surface and the steel sheet can be provided. Accordingly, the present invention is highly applicable to the industries of manufacturing and using electrical steel sheets.

What is claimed is:

1. A grain-oriented electrical steel sheet comprising:
    a steel sheet; and
    an amorphous oxide layer that is formed on the steel sheet,
    wherein a glossiness of a surface of the grain-oriented electrical steel sheet including the amorphous oxide layer is 150% or higher.

2. The grain-oriented electrical steel sheet according to claim 1,
    wherein the steel sheet includes, as a chemical composition, by mass %,
    C: 0.085% or less,
    Si: 0.80% to 7.00%,
    Mn: 1.00% or less,
    Al: 0.065% or less,
    S: 0.013% or less,
    Cu: 0% to 0.80%,
    N: 0% to 0.012%,
    P: 0% to 0.5%,
    Ni: 0% to 1.0%,
    Sn: 0% to 0.3%,
    Sb: 0% to 0.3%, and
    a remainder of Fe and impurities.

3. The grain-oriented electrical steel sheet according to claim 2,
    wherein the steel sheet includes, as the chemical composition, by mass %, Cu: 0.01% to 0.80%.

4. The grain-oriented electrical steel sheet according to claim 2,
    wherein the glossiness is measured using a method described in JIS Z-8741.

5. The grain-oriented electrical steel sheet according to claim 3,
    wherein the glossiness is measured using a method described in JIS Z-8741.

6. The grain-oriented electrical steel sheet according to claim 1,
    wherein the glossiness is measured using a method described in JIS Z-8741.

* * * * *